United States Patent [19]

Baran, Jr.

[11] Patent Number: 4,627,233
[45] Date of Patent: Dec. 9, 1986

[54] STATOR ASSEMBLY FOR BOUNDING THE WORKING MEDIUM FLOW PATH OF A GAS TURBINE ENGINE

[75] Inventor: Walter J. Baran, Jr., South Glastonbury, Conn.

[73] Assignee: United Technologies Corporation, Hartford, Conn.

[21] Appl. No.: 725,175

[22] Filed: Apr. 19, 1985

Related U.S. Application Data

[62] Division of Ser. No. 518,908, Aug. 1, 1983.

[51] Int. Cl.$^4$ .......................... F02C 1/06; F01D 5/14; F03B 7/00
[52] U.S. Cl. .................... 60/39.161; 415/115; 415/177
[58] Field of Search ............... 415/115, 116, 117, 178, 415/175, 176, 108; 60/39.07, 39.161

[56] References Cited

U.S. PATENT DOCUMENTS

| | | | |
|---|---|---|---|
| 3,826,084 | 7/1974 | Branstrom et al. | 415/115 |
| 3,980,411 | 9/1976 | Crow | 415/115 |
| 4,019,320 | 4/1977 | Redinger, Jr. et al. | 415/116 |
| 4,135,362 | 1/1979 | Glenn | 415/115 |
| 4,184,797 | 1/1980 | Anderson et al. | 415/115 |
| 4,214,852 | 7/1980 | Tuley et al. | 415/115 |
| 4,375,891 | 3/1983 | Pask | 415/115 |
| 4,386,885 | 7/1983 | Beckershoft | 415/116 |
| 4,428,713 | 1/1984 | Coplin et al. | 415/116 |

Primary Examiner—Louis J. Casaregola
Assistant Examiner—Timothy S. Thorpe
Attorney, Agent, or Firm—Gene D. Fleischhauer

[57] ABSTRACT

A stator assembly 20 for a gas turbine engine is disclosed. The stator assembly includes an outer case 22 and an array of stator vanes 32 extending inwardly across an annular flow path 18 for working medium gases. The stator assembly includes a duct 34 which engages the stator vanes and which is trapped between a stator vane and a stator element 38 extending inwardly from the outer case. The duct includes a transition piece 78 which extends axially to shield a portion of the stator vane. In one embodiment the duct includes an extension 80 which extends into proximity with an outer air seal assembly 31 to form a cooling air chamber 36 adjacent to the stator element.

4 Claims, 4 Drawing Figures

STATOR ASSEMBLY FOR BOUNDING THE WORKING MEDIUM FLOW PATH OF A GAS TURBINE ENGINE

This is a division of application Ser. No. 518,908 filed on Aug. 1, 1983.

TECHNICAL FIELD

This invention relates to gas turbine engines and more particularly to a stator assembly adjacent to the flow path for working medium gases of such an engine. This invention was developed in the field of aircraft gas turbine engines and has application to turbine engines in other fields that employ arrays of stator vanes to direct a working medium fluid.

BACKGROUND ART

An example of a gas turbine engine of the type to which the present invention applies is a gas turbine engine having a compression section, a combustion section and a turbine section. An annular flow path for working medium gases extends axially through such an engine. A rotor assembly extends axially through the compression and turbine sections and is circumscribed by a stator assembly. The stator assembly includes an engine case. Rows of rotor blades extend outwardly from the rotor across the working medium flow path in both the turbine and compression sections. An array of stator vanes extends inwardly from the engine case across the working medium flow path at the downstream end of most blade rows for directing the working medium gases of the engine into the next working station of the engine.

Examples of engine structures employing rotor blades and stator vanes inwardly of an outer case are shown in: U.S. Pat. No. 3,966,354 issued to Patterson entitled "THERMAL ACTUATED VALVE FOR CLEARANCE CONTROL"; U.S. Pat. No. 3,992,126 issued to Brown et al. entitled "TURBINE COOLING"; and U.S. Pat. No. 4,011,718 issued to Asplund entitled "GAS TURBINE CONSTRUCTION".

As shown in these patents, the combustion section of the engine is used to burn fuel in the engine to add energy to the working medium gases. As the hot, working medium gases are expanded through the turbine section of the engine, the arrays of rotor blades and stator vanes immediately downstream of the combustion section are bathed in the working medium gases. In this region of the engine, cooling air is flowed inwardly of the outer case to the interior of the stator vanes to maintain the temperature of the stator vanes within acceptable levels.

At some location downstream of the cooled arrays of stator vanes cooling air is not flowed to the interior of the vanes. An example of such a construction is shown in U.S. Pat. No. 3,644,057 issued to Steinbarger entitled "LOCKING DEVICE". Even though the stator vanes are not cooled internally, efforts are being made to ensure that the stator vanes and associated components are not unacceptably heated by the hot working medium gases. Accordingly, scientists and engineers are working to develop a stator assembly employing stator vanes which avoids the unacceptable heating of the stator vanes and components associated with the stator vanes.

DISCLOSURE OF INVENTION

According to the present invention, a gas turbine engine having a working medium flow path, an outer case extending about the flow path, and an array of stator vanes supported from the outer case, includes a duct that engages the array of stator vanes at one location, engages the stator vanes and the case at another location and extends between the locations to shield the array of stator vanes from the working medium gases.

In accordance with one embodiment, the duct is formed of arcuate segments each having a cantilevered extension which extends into proximity with an adjacent stator element to form a cooling air cavity adjacent to the engagement between the case, the vanes and the duct.

A primary feature of the present invention is a stator structure for a gas turbine engine. The stator structure includes a duct formed of a plurality of circumferentially extending segments. The duct has an axially extending portion which bounds the working medium flow path. Another feature is an array of stator vanes. Each stator vane has at least one airfoil which extends across the working medium flow path. Each vane engages the outer case. The duct engages the stator vanes at one location and is trapped between the stator vanes and the case at another location. In one embodiment, the duct has a cantilevered extension. The extension extends axially into proximity with an adjacent stator structure to form a cooling air chamber adjacent to the attachment of the duct to the case. The vanes are spaced from the outer case to form a second cooling chamber. A plurality of holes extend through the outer case adjacent to the attachment to provide a flow passage for cooling air through the slots from one cooling air chamber to the other. In one embodiment, each airfoil has a leading edge, a trailing edge and a chordwise dimension L. The length from the leading edge to the attachment at the case is a distance $L'$ which is greater than or equal to the distance L ($L' > L$).

A primary advantage of the present invention is the fatigue and creep life of the stator structure at the attachment of the vane to the case which results from interfering with the transfer of heat from the working medium gases through the airfoils of the vanes to the casing. Another advantage is the aerodynamic efficiency which results from defining the working medium flow path with an axially extending duct. Still another advantage is the interchangeability of the high pressure turbine with the low pressure turbine which results from having a duct which is easily replaced with another duct having a different contour but which is adapted to engage the vanes of the low turbine and the case in the same way that the replaced duct engages the vane and the case.

The foregoing features and advantages of the present invention will become more apparent in the light of the following detailed description of the best mode for carrying out the invention and in the accompanying drawing.

BEST MODE FOR CARRYING OUT THE INVENTION

Figure 1:
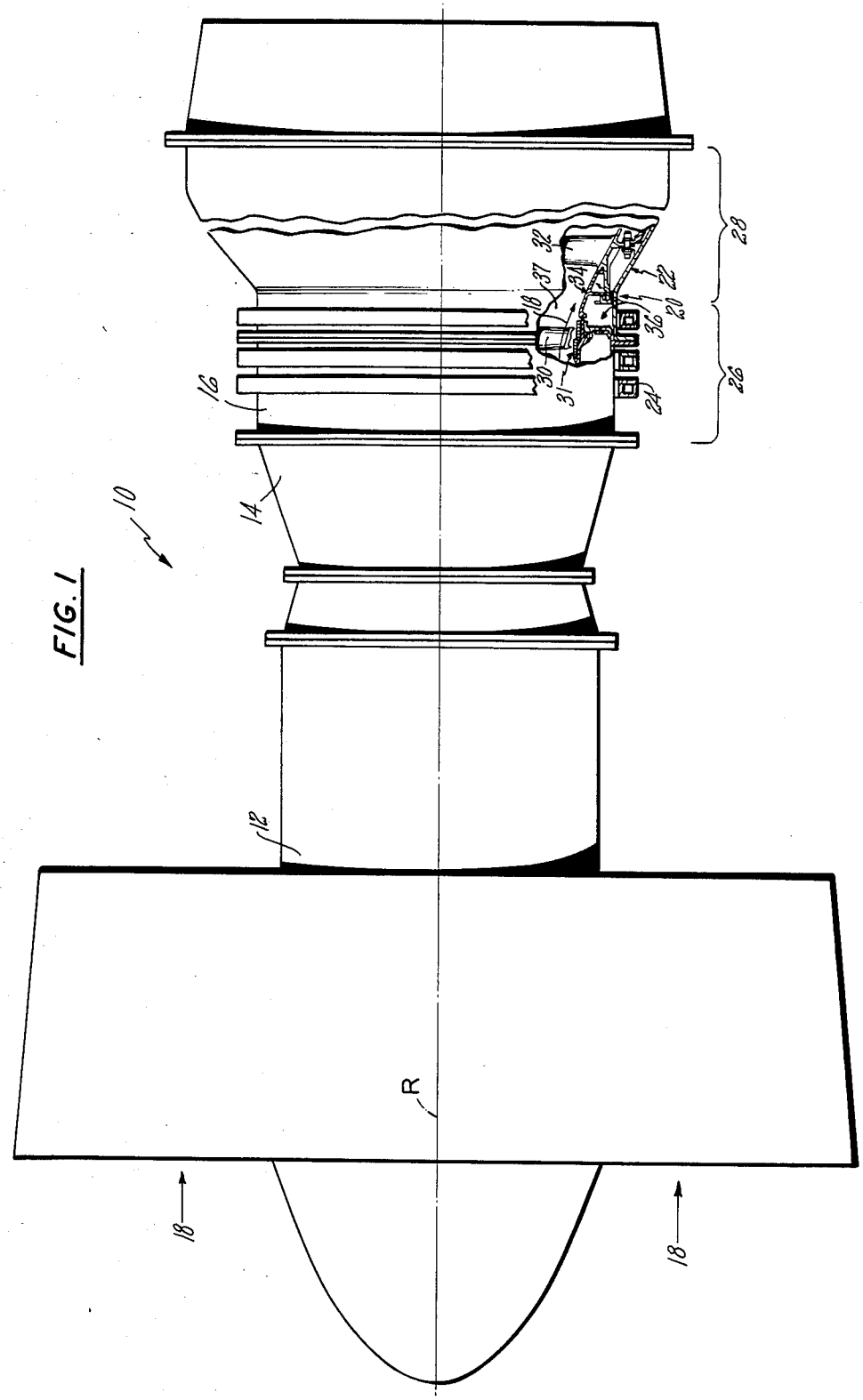
FIG. 1 is a side elevation view of an axial flow, gas turbine engine with a portion of the outer case broken away to show a portion of the turbine section.

FIG. 1 shows an axial flow, gas turbine engine 10 which has an axis of rotation R. A portion of the engine is broken away for clarity. The engine has a compression section 12, a combustion section 14 and a turbine section 16. An annular flow path 18 for working medium gases extends axially through the sections of the engines. A stator assembly 20 extends axially through these sections to bound the working medium flow path. The stator assembly includes an outer case 22 which extends circumferentially about the working medium flow path.

A plurality of cooling air tubes 24 extends circumferentially about the outer case 22 in the turbine section 16. The cooling air tubes are in flow communication with a source of cooling air such as the compression section 12. The tubes are adapted to impinge cooling air on the outer case during preselected operating conditions of the engine to adjust internal operating clearances in the turbine section.

The turbine section 16 includes a high pressure turbine 26 and a low pressure turbine 28. An array of rotor blades in the high pressure turbine, as represented by the single rotor blade 30, extends outwardly across the working medium flow path. An outer air seal assembly 31 is spaced radially from the array of rotor blades and is attached to the outer case 22. In the low pressure turbine, the stator assembly includes an array of stator vanes as represented by the single stator vane 32. A duct formed of a plurality of arcuate segments, as represented by the single segment 34, extends between the stator vanes of the low pressure turbine and the outer air seal of the high pressure turbine. The duct is spaced radially from the outer case leaving a first cooling air chamber 36 therebetween. The annular flow path 18 inwardly of the duct includes an annular transition region 37 with extends from the array of rotor blades of the high pressure turbine to the array of stator vanes of the low pressure turbine.

Figure 2:
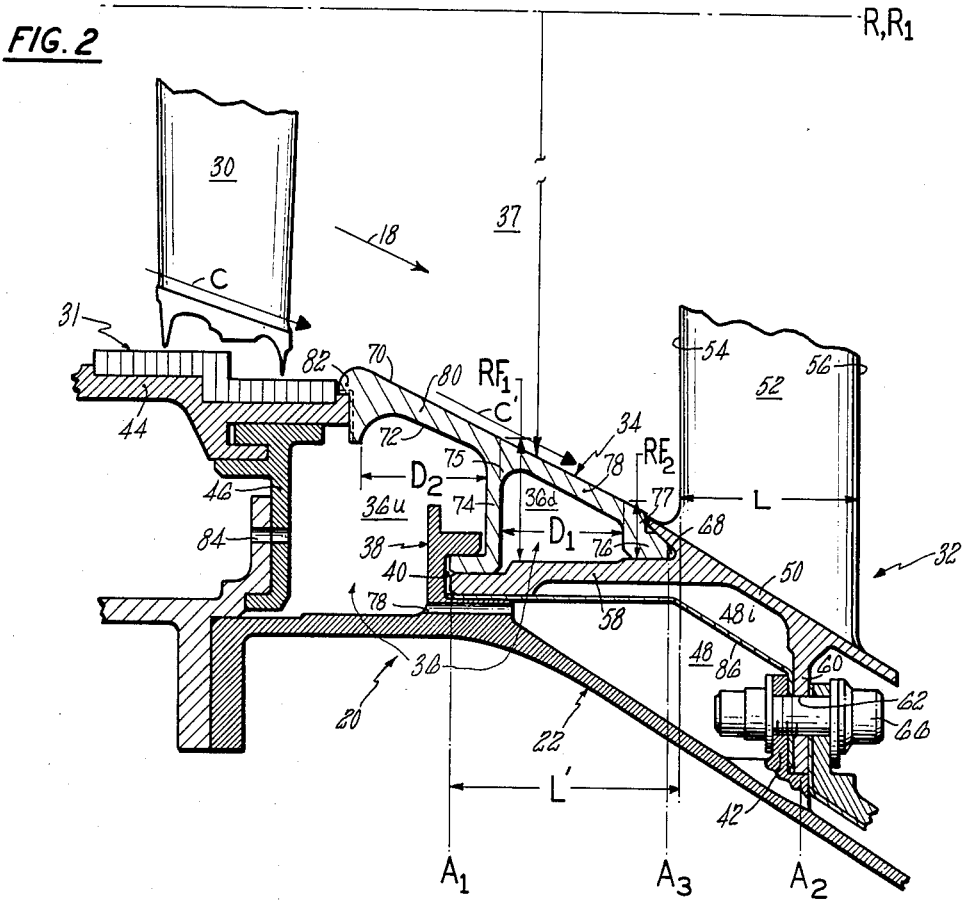
FIG. 2 is an enlarged cross-sectional view of the portion of the turbine section shown in FIG. 1.

FIG. 2 is an enlarged cross-sectional view of a portion of the gas turbine engine shown in FIG. 1 showing in more detail elements of the stator assembly 20 such as the outer case 22, the outer air seal assembly 31, the array of stator vanes 32 and the duct 34.

The outer case 22 has a first stator element, such as the first flange 38, which extends inwardly from the outer case. The flange is adapted by a groove 40 at a first axial location $A_1$ to trap the array of stator vanes 32 and the duct 34. A second stator element, such as the second flange 42, extends inwardly from the outer case. The second flange is located at a second axial location $A_2$ which is spaced axially from the first location. A third stator element, such as the adjacent outer air seal assembly 31, is spaced axially from the first flange. The outer air seal assembly includes a plurality of arcuate seal segments 44 which are spaced radially from the array of rotor blades. A plurality of arcuate rings 46 extend radially inwardly from the outer case to the arcuate seal segments for supporting the downstream end of the arcuate seal segments from the outer case.

The array of stator vanes 32 extends circumferentially about the annular flow path 18 for working medium gases. Each stator vane is spaced circumferentially from the adjacent vane and is spaced radially from the outer case 22 leaving a second chamber 48 for cooling air therebetween. The stator vane has a platform 50 and at least one airfoil 52 extending inwardly from the platform across the working medium flow path. The airfoil has a leading edge 54, a trailing edge 56 and a chordwise dimension L extending between the leading edge and the trailing edge. The chordwise dimension L is measured in a direction that is perpendicularly oriented with respect to both the leading edge and the trailing edge at a location adjacent to the platform. The vane has a first foot 58 which extends for a distance L' from the leading edge of the airfoil. The length L' is greater than or equal to the length L ($L' \geq L$).

The first foot 58 of the vane extends axially across the first and second cooling chambers to the outer case. The first foot is trapped by the first flange 38 of the outer case. The vane has a second foot 60 which is adjacent to the second flange 42 of the outer case. Each second foot has a hole 62. The second flange has a plurality of bolt holes 64, each of which is circumferentially spaced from an adjacent hole such that the hole 62 in the vane is aligned with an associated hole in the second flange. These holes adapt the flange and the vane to receive a fastener such as a bolt and nut combination 66 for securing the vane to the second flange. The vane also includes a groove 68 which is bounded by the platform 50 and the first foot of the vane. The groove 68 extends circumferentially in the array of vanes at a third axial location $A_3$ located axially between the first axial location $A_1$ and the second axial location $A_2$.

Each arcuate duct segment 34 has an axis of radius $R_1$ which is coincident with the axis of rotation R. The duct segment has a concave side 70 which bounds the transition region of the flow path and a convex side 72 which is spaced radially from the outer case to form the first circumferentially extending chamber 36 for cooling air therebetween. The duct segment has a first foot 74 at a first end 75 which is radially oriented with respect to the axis R. Ihe first foot extends radially inwardly across the first chamber to the outer case 22. The first foot of each duct segment is trapped between an associated vane 32 of the array and the first flange 38 of the outer case at the first axial location. A second foot 76 at a second end 77 is radially oriented with respect to the axis R and is spaced axially from the first foot by a distance $D_1$. The second foot on each duct segment extends into the groove 68 of the vane and is trapped by the vane at the third location $A_3$. A transition piece 78 is disposed radially inwardly of the first foot. The transition piece is angled with respect to the axis of radius $R_1$ and extends axially between the first foot and the second foot of the duct. The transition piece has an extension 80 which extends in cantilevered fashion for a second distance $D_2$ from the first foot into proximity with the outer air seal assembly. The second distance $D_2$ is equal to or greater than the first distance $D_1$. The extension has a curved nose 82 which extends axially over the outer air seal assembly. The dotted lines show the relationship between the outer air seal assembly and the duct segment before operation of the gas turbine engine begins.

A plurality of cooling air holes 78 in the first flange 38 of the outer case 22 connects the first cooling air chamber 36 (between the duct 34 and the outer case 22) with the second chamber 48 (between the array of stator vanes 32 and the outer case). The first cooling air chamber is divided by the first foot of the duct into an upstream chamber $36_u$ and a downstream chamber $36_d$. The upstream chamber is bounded by the first foot of the duct, the extension of the duct 80, the outer case and the outer air seal assembly 30 to define a smaller chamber which is adjacent to the first stator element. A plurality of holes 84 in the outer air seal assembly adapts the outer air seal to place the upstream chamber in flow communication with a source of high pressure cooling air such as the compression section 12. A seal member 86 extends circumferentially in the second cooling air chamber and axially from the first flange at the first axial location $A_1$ to the second flange 42 at the second axial location $A_2$ to provide a seal to the cooling air chamber between the vane and the outer case. An inner cooling air chamber $48_i$ is formed between the vanes and the seal member.

Figure 3:
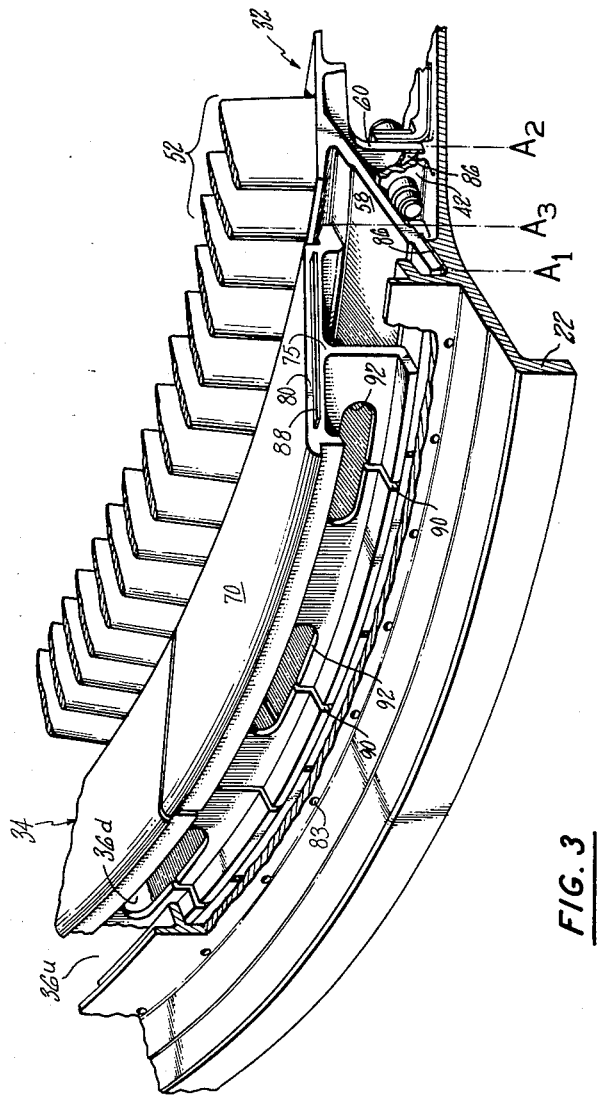
FIG. 3 is a partial perspective view of a portion of the turbine section of the engine.

FIG. 3 is a partial perspective view of the outer case 22, the array of stator vanes 32, and the array of arcuate duct segments 34 shown in FIG. 2. The seal member 86 and the second flange 42 are broken away and sectioned to better show the relationship between the second flange and the second foot 60 of the vanes. As shown in this embodiment, each stator vane includes three airfoils extending inwardly across the working medium flow path. Each duct segment is spaced circumferentially from the adjacent duct segment and is adapted by a groove to receive a feather seal 78. The first foot of each duct segment has at least one slot 90 and a circumferentially extending opening 92 to reduce the hoop strength of the segment. Cooling air from the upstream chamber $36_u$ is in flow communication with the downstream chamber $36_d$ through the slots and openings. A small amount of cooling air flows into the downstream chamber and through the gap between the adjacent vane segments into the inner chamber $48_i$ formed between the circumferentially extending seal member and the array of stator vanes. Thus, the first foot of the stator vane and the first stator flange are bathed in cooling air on all sides.

Figure 4:
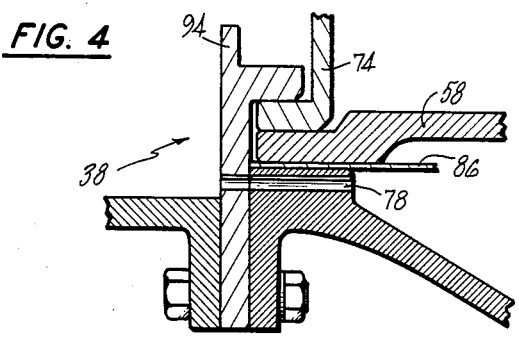
FIG. 4 is an alternate embodiment of the flange shown in FIG. 2.

FIG. 4 is an alternate embodiment of the first flange 38 shown in FIG. 2. In FIG. 2, the flange and the outer case 22 form a one-piece structure. In the alternate embodiment, the flange includes a circumferentially extending ring 94 which is integrally attached to the outer case.

During operation of the gas turbine engine, working medium gases are flowed along the annular flow path 18 which extends axially through the engine. The gases are compressed in the compression section 12 and mixed with fuel in the combustion section 14. The gases and fuel are burned together to add energy to the gases. The hot, high pressure gases are flowed from the combustion section to the turbine section 16 of the engine. The gases are expanded in the turbine section through arrays of rotor blades 30 and stator vanes 32 to extract useful work from the gases.

As the gases are discharged from the array of rotor blades 30 at the downstream end of the high pressure turbine 26, the gases are passed through the transition region 37. The gases experience a sudden expansion in the transition region before being passed into the low pressure turbine 28. Because of the sudden expansion of the working medium gases, the velocity of the hot gases decreases and the static pressure increases creating the potential for significant flow losses if the flow path is not contoured to avoid these losses.

Accordingly, the transition piece 78 of the duct 34 is aerodynamically contoured to minimize flow losses connected with the sudden expansion. An example of such contouring is the nose 82 of the transition piece which is rounded to provide a smooth transition between the flow path contour C at the downstream side of the rotor blade 30 and the flow path contour C' along the length of the duct and the platform 50 of the vane.

A redesigned low turbine having a different rate of expansion or recontoured vane platforms 50 at the entrance to the low turbine might be employed in place of the low pressure turbine 28 shown in FIG. 2. The duct makes easier such redesigns by providing a separate element of stator structure which is easily removed and replaced with a recontoured duct to provide a customized transition region that joins the old high pressure turbine with the new low pressure turbine. In a similar fashion, a new high pressure turbine might be joined to an old low pressure turbine.

As the hot working medium gases pass through the transition region 37, heat is lost from the gases to the stator assembly 20. In particular, the uncooled airfoils 52 of the array of stator vanes 32 are bathed in the hot working medium gases. A portion of the heat transferred to the airfoils is transferred through the vanes to the outer case at the points of attachment of the vanes to the case.

The point of attachment at the first flange 38 is especially susceptible to the phenomenon known as creep because heat is transferred through the vanes to the outer case at the flange and because forces exerted by the working medium gases on the airfoils are transferred at the first flange to the outer case. Accordingly, several structural elements of the stator assembly are designed to limit the transfer of heat from the working medium gases to the first flange of the case, thereby limiting the operating temperature of that portion of the case and enhancing its creep life. The duct 34 is a key element of this design.

The temperature of the working medium gases in the transition region 37 is greatest at the entrance to the region and decreases in the axial direction as the gases expand. As the gases pass through the transition region, the extension 80 of the transition piece 78 of the duct extends upstream of the first flange 38 to shield the first flange 38 from the hot gases and to prevent the direct contact between the gases and the flange.

Heat is transferred from the gases by convection and radiation to the transition piece 78. The temperature gradient in the transition piece which results from this transfer of heat generally follows the temperature gradient in the gases and decreases in the axially rearward direction. The first foot 74 of the duct is spaced by the extension from the hot upstream part of the transition piece. This decreases the radial temperature gradient in the first foot as compared with constructions having the first foot secured to the hot part of the transition piece and decreases the radial conduction of heat from the transition piece outwardly to the first flange 38. In addition, as shown in FIG. 3, the first foot has elongated openings 92 to decrease the area through which heat will flow in the radial direction thereby increasing the thermal resistance of the foot to the flow of heat.

Heat which is transferred through the airfoils 52 to the leading edge region 54 of the platform of the vane is conducted toward the first flange 38 by the first foot 58. The length of the first foot of the vane increases the thermal resistance of the vane as compared with those constructions in which the first foot is of shorter length. As compared with such constructions, this increased thermal resistance decreases the amount of heat transferred from the leading edge region of the vane to the first flange. In addition, the first foot 74 of the duct 34 and the first foot 58 of the vane are bathed in the cooling air at the upstream and downstream chambers $36_u, 36_d$ of the first cooling air chamber 36 and the inner chamber $48_i$ of the second cooling air chamber 48. Finally, the cooling holes 84 which place the first cooling air chamber in flow communication with the second cooling air chamber provide a plurality of cooling conduits for cooling the base of the first flange.

As a result of these measures, the first flange 38 and the region about the first flange on the outer case 22 operate at a much cooler temperature than a similar case not employing measures such as the shielding provided to the first flange, the increase in thermal resistance to conduction of those elements contacting the first flange such as the first foot 74 of the duct and the first foot 58 of the vane, the direct cooling of the first flange by the holes 84 extending through the first flange and the cooling provided by the first cooling chamber 36 and the second cooling chamber 48 to the outer case 22 and elements 58,74 conducting heat to the outer case. Because creep is directly proportional to temperature, the lower temperature increases the creep life of the outer case around the first flange as compared with constructions which are unshielded and not cooled by cooling chambers and cooling air holes.

These measures to decrease the case temperature in the region of the first flange 38 are so effective that often the temperature in the region about the first flange is smaller than the case temperature in the region about the second flange 42. Because of the differences in temperature, differences in radial growth occur. This difference in radial growth causes the vane to rotate slightly about the second flange in the axial direction causing the airfoil to tilt rearwardly by a slight amount. Tolerance variations in the radial height of the first foot 58 of the vane and the first foot 74 of the duct also cause a small amount of vane rotation.

The tilt of the airfoil due to vane rotation is proportional to the radius of rotation of the airfoil that extends from the point of rotation at the second flange to the first flange which acts to resist the rotation of the vane. In the embodiment shown, the radius of rotation is equal to the overall length of the vane. The overall length is extended by the long first foot of the vane which extends a distance at least equal to the chordwise dimension L of the airfoil. This longer overall length decreases the tilt of the airfoil 52 for a given tolerance variation or difference in radial growth as compared with vanes having a shorter overall length. As a result, flow losses which result from tilting of the airfoil are decreased and the aerodynamic efficiency of the engine is improved.

Although the invention has been shown and described with respect to detailed embodiments thereof, it should be understood by those skilled in the art that various changes in form and detail thereof may be made without departing from the spirit and the scope of the claimed invention.

I claim:

1. An arcuate duct segment for an axial flow gas turbine engine, the engine having a high pressure turbine, a low pressure turbine and a transition region extending between the turbines, the segment having an axis of radius $R_1$, a convex side and a concave side disposed about the axis, the concave side adapting the duct segment to bound the transition region, which comprises:

a first foot which extends circumferentially about the convex side of the segment, which is radially oriented with respect to the axis $R_1$, and which has a radial length $R_{f1}$ from the concave side;

a second foot which extends circumferentially about the convex side of the segment, which is radially oriented with respect to the axis $R_1$, which has a radial length $R_{f2}$ from the concave side and which is spaced axially from the first foot by a first distance $D_1$;

a transition piece having said concave side which is angled with respect to the axis of the segment, which has a span extending between the first foot and the second foot for joining the first foot to the second foot and which has an extension projecting from the first foot in cantilevered fashion and extending a second distance $D_2$ from the first foot;

wherein the distance $D_2$ is equal to or greater than the first distance $D_1$ and wherein the radial length $R_{f1}$ of the first foot is greater than one and one half times the radial length $R_{f2}$ of the second foot such that a change in the length of the first foot facilitates accommodating a change in the angle of the concave side with respect to the axis of the segment during a redesign of the turbine which causes the diameter of the flow path of the high pressure turbine to change with respect to the flow path of the low pressure turbine.

2. The arcuate duct segment of claim 1 wherein the arcuate duct segment has a chamber defined by the first foot, the second foot and the span extending between the first foot and the second foot, wherein the first foot and the extension cantilevered from the first foot bound a first region and wherein the first flange has at least one hole extending therethrough to place the chamber in flow communication with the first region.

3. The arcuate duct segment of claim 2 wherein the extension has a curved nose which is adapted to engage an adjacent structure.

4. The arcuate duct segment of claim 3 wherein the first foot has a circumferentially extending flange that adapts the foot to engage an adjacent structure and has at least one slot extending through the flange and to a hole in the first foot.

* * * * *

UNITED STATES PATENT AND TRADEMARK OFFICE
CERTIFICATE OF CORRECTION

PATENT NO. : 4,627,233
DATED : Dec. 9, 1986
INVENTOR(S) : Walter J. Baran, Jr.

It is certified that error appears in the above-identified patent and that said Letters Patent is hereby corrected as shown below:

Col. 8, line 48, change "flange" to --foot--

Signed and Sealed this

Seventh Day of March, 1989

Attest:

DONALD J. QUIGG

*Attesting Officer*  *Commissioner of Patents and Trademarks*